United States Patent
Yang et al.

(10) Patent No.: US 10,010,966 B2
(45) Date of Patent: *Jul. 3, 2018

(54) ELECTRODE FOR RESISTANCE SPOT WELDING OF DISSIMILAR METALS

(71) Applicant: GM GLOBAL TECHNOLOGY OPERATIONS LLC, Detroit, MI (US)

(72) Inventors: David S. Yang, Shanghai (CN); David R. Sigler, Shelby Township, MI (US); Blair E. Carlson, Ann Arbor, MI (US); James G. Schroth, Troy, MI (US); Michael J. Karagoulis, Okemos, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 49 days.

This patent is subject to a terminal disclaimer.

(21) Appl. No.: 14/181,020

(22) Filed: Feb. 14, 2014

(65) Prior Publication Data

US 2015/0231729 A1    Aug. 20, 2015

(51) Int. Cl.
*B23K 9/24* (2006.01)
*B21D 39/00* (2006.01)
(Continued)

(52) U.S. Cl.
CPC ............. *B23K 11/20* (2013.01); *B23K 11/115* (2013.01); *B23K 11/3009* (2013.01);
(Continued)

(58) Field of Classification Search
CPC ... B23K 11/115; B23K 11/20; B23K 11/3009; B23K 11/3018; B23K 2203/20; B23K 35/0205; B23K 35/0261
(Continued)

(56) References Cited

U.S. PATENT DOCUMENTS 3,592,994 A * 7/1971 Ford ................. B23K 35/0205
219/119
3,596,043 A * 7/1971 Sporri ................. B23K 11/309
219/83
(Continued)

FOREIGN PATENT DOCUMENTS

CN    101405105 A    4/2009
EP    1974847 A2 * 10/2008 ........... B23K 11/115
(Continued)

OTHER PUBLICATIONS

JP_11342477_A_H.pdf.*
(Continued)

*Primary Examiner* — Dana Ross
*Assistant Examiner* — Ket D Dang
(74) *Attorney, Agent, or Firm* — Reising Ethington P.C.

(57) ABSTRACT

A method of spot welding a workpiece stack-up that includes a steel workpiece and an aluminum alloy workpiece involves passing an electrical current through the workpieces and between welding electrodes that are constructed to affect the current density of the electrical current. The welding electrodes, more specifically, are constructed to render the density of the electrical current greater in the steel workpiece than in the aluminum alloy workpiece. This difference in current densities can be accomplished by passing, at least initially, the electrical current between a weld face of the welding electrode in contact with the steel workpiece and a perimeter region of a weld face of the welding electrode in contact with the aluminum alloy workpiece.

15 Claims, 6 Drawing Sheets

(51) Int. Cl.
*B23K 11/20* (2006.01)
*B23K 11/11* (2006.01)
*B23K 11/30* (2006.01)
*B23K 35/02* (2006.01)
*B23K 103/20* (2006.01)

(52) U.S. Cl.
CPC ...... *B23K 11/3018* (2013.01); *B23K 35/0205* (2013.01); *B23K 35/0261* (2013.01); *B23K 2203/20* (2013.01)

(58) Field of Classification Search
USPC ..... 219/92, 117.1, 118, 119, 121.13–121.17, 219/127, 128, 130.32, 136, 148, 162, 74, 219/91.2, 86.1, 120, 93, 68; 428/653, 428/612, 472.2, 567, 608, 652, 663, 674, 428/677, 684; 29/521
See application file for complete search history.

(56) References Cited

U.S. PATENT DOCUMENTS

| | | | | |
|---|---|---|---|---|
| 4,400,608 | A * | 8/1983 | Wagatsuma | B23K 35/0205 219/107 |
| 5,302,797 | A * | 4/1994 | Yasuyama | B23K 11/115 219/118 |
| 5,304,769 | A * | 4/1994 | Ikegami | B23K 35/0205 219/119 |
| 5,783,794 | A * | 7/1998 | Oikawa | B23K 11/115 219/118 |
| 6,323,458 | B1 * | 11/2001 | Nomura | B23K 1/19 219/148 |
| 7,126,077 | B2 * | 10/2006 | Wang | B23K 11/3009 219/117.1 |
| 7,815,122 | B2 * | 10/2010 | Bauer | G06K 19/07749 219/117.1 |
| 7,850,059 | B2 | 12/2010 | Kobayashi et al. | |
| 7,935,908 | B2 | 5/2011 | Nakagawa et al. | |
| 7,984,840 | B2 | 7/2011 | Kobayashi et al. | |
| 8,020,749 | B2 | 9/2011 | Kobayashi et al. | |
| 8,058,584 | B2 | 11/2011 | Miyamoto et al. | |
| 8,350,179 | B2 * | 1/2013 | Schroth | B23K 11/115 219/117.1 |
| 8,487,206 | B2 | 7/2013 | Urushihara et al. | |
| 2003/0192863 | A1 * | 10/2003 | Wang | B23K 11/11 219/117.1 |
| 2005/0218121 | A1 * | 10/2005 | Hayashi | B23K 11/20 219/118 |
| 2005/0247679 | A1 * | 11/2005 | Wang | B23K 11/3009 219/117.1 |
| 2006/0081563 | A1 * | 4/2006 | Ueda | B23K 11/30 219/119 |
| 2007/0212565 | A1 * | 9/2007 | Urushihara | B23K 11/20 428/577 |
| 2009/0011269 | A1 * | 1/2009 | Urushihara | B23K 11/115 428/594 |
| 2009/0050608 | A1 * | 2/2009 | Hayashi | B23K 11/115 219/121.14 |
| 2009/0218323 | A1 * | 9/2009 | Abe | B23K 11/258 219/86.25 |
| 2009/0255908 | A1 * | 10/2009 | Sigler | B23K 11/115 219/91.2 |
| 2009/0302009 | A1 * | 12/2009 | Sigler | B23K 11/115 219/117.1 |
| 2011/0097594 | A1 * | 4/2011 | Tanaka | B23K 11/115 428/594 |
| 2011/0123825 | A1 * | 5/2011 | Sakurai | B23K 11/115 428/650 |
| 2013/0168366 | A1 | 7/2013 | Kinefuchi et al. | |
| 2013/0189023 | A1 | 7/2013 | Spinella | |
| 2015/0096962 | A1 * | 4/2015 | Sigler | B23K 11/20 219/91.2 |

FOREIGN PATENT DOCUMENTS

| | | | |
|---|---|---|---|
| GB | 2358826 | A | 8/2001 |
| JP | 11342477 | | 12/1999 |
| JP | 11342477 | A * | 12/1999 |
| JP | 2008093707 | A | 4/2008 |
| KR | 101273380 | B1 | 6/2013 |
| WO | WO 2007055130 | A1 * | 5/2007 ........... B23K 11/258 |

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

Yang et al., U.S. Appl. No. 14/181,020 entitled "Electrode for Resistance Spot Welding of Dissimilar Metals," filed Feb. 14, 2014.

Yang et al., U.S. Appl. No. 14/181,955 entitled "Resistance Spot Welding Steel and Aluminum Workpieces with Protuberance," filed Feb. 17, 2014.

Sigler et al., U.S. Appl. No. 14/268,422 entitled "Resistance Spot Welding of Steel to Pre-Coated Aluminum," filed May 2, 2014.

Sigler et al., U.S. Appl. No. 14/462,655 entitled "Resistance Spot Welding Steel and Aluminum Workpieces Using Electrode Weld Face Cover," filed Aug. 19, 2014.

Sigler et al, U.S. Appl. No. 14/464,476 entitled "Multi-Step Direct Welding of an Aluminum-Based Workpiece to a Steel Workpiece," filed Aug. 20, 2014.

Schroth et al., U.S. Appl. No. 14/488,799 entitled "Resistance Spot Welding Steel and Aluminum Workpieces with Hot Welding Electrode at Aluminum Workpiece," filed Sep. 17, 2014.

(56) References Cited

OTHER PUBLICATIONS

Carlson et al, U.S. Appl. No. 14/503,504 entitled "Resistance Spot Welding Steel and Aluminum Workpieces Using Insertable Cover," filed Oct. 1, 2014.
Sigler et al., U.S. Appl. No. 14/503,969 entitled "Aluminum Alloy to Steel Welding Process," filed Oct. 1, 2014.
Wang et al, U.S. Appl. No. 14/561,746 entitled "Resistance Spot Welding Steel and Aluminum Workpieces with Electrode Insert," filed Dec. 5, 2014.

* cited by examiner

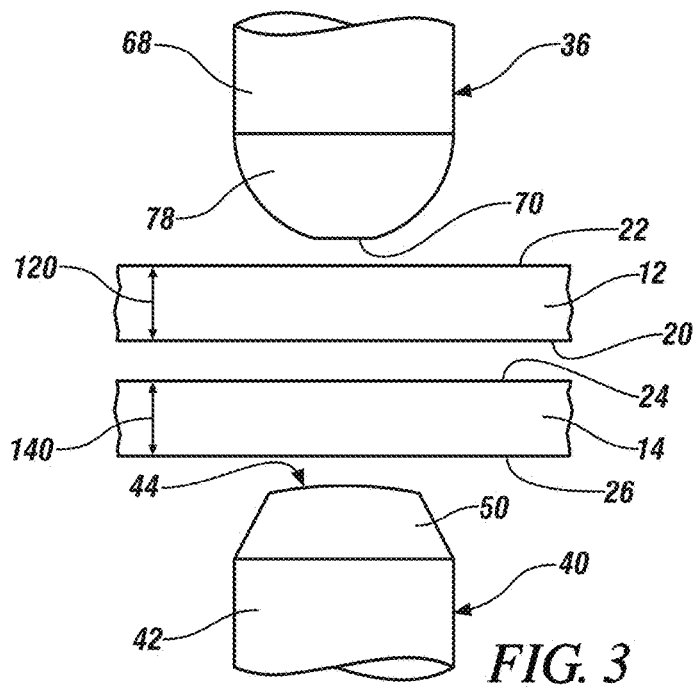
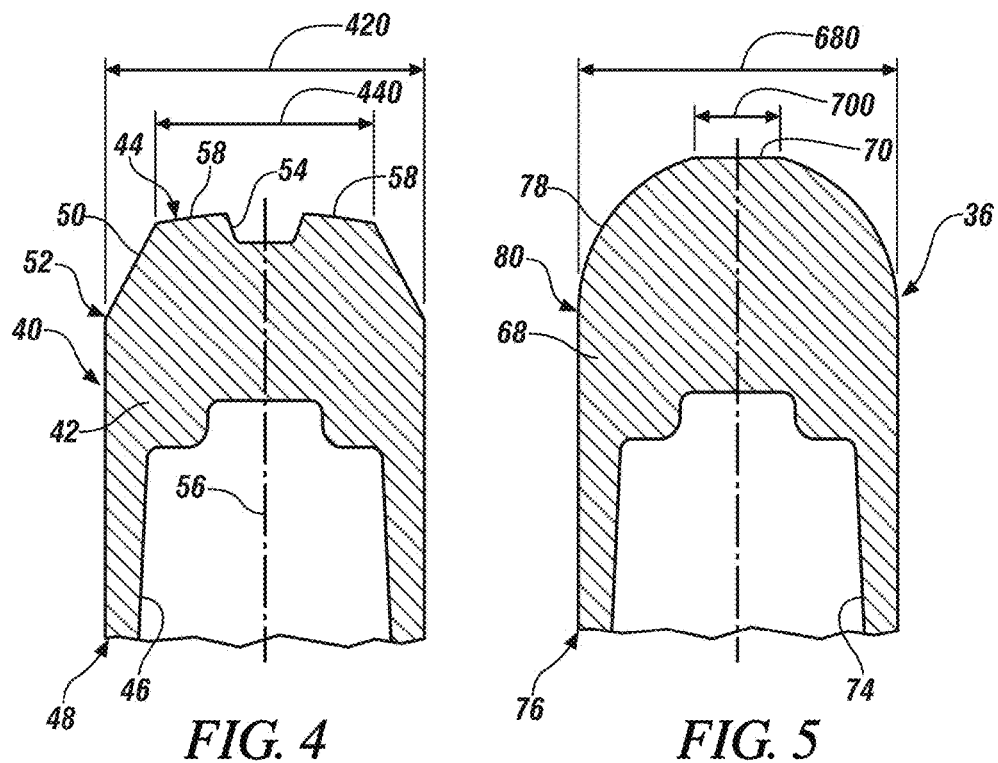

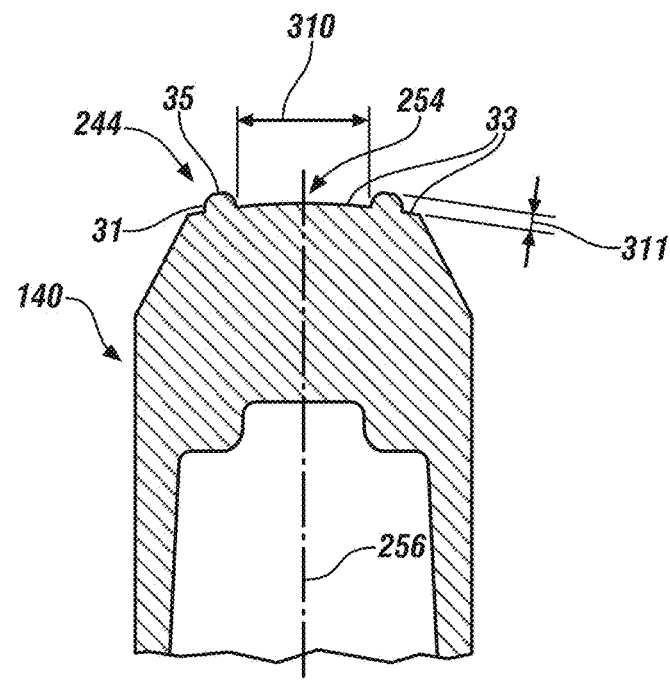
*FIG. 9*
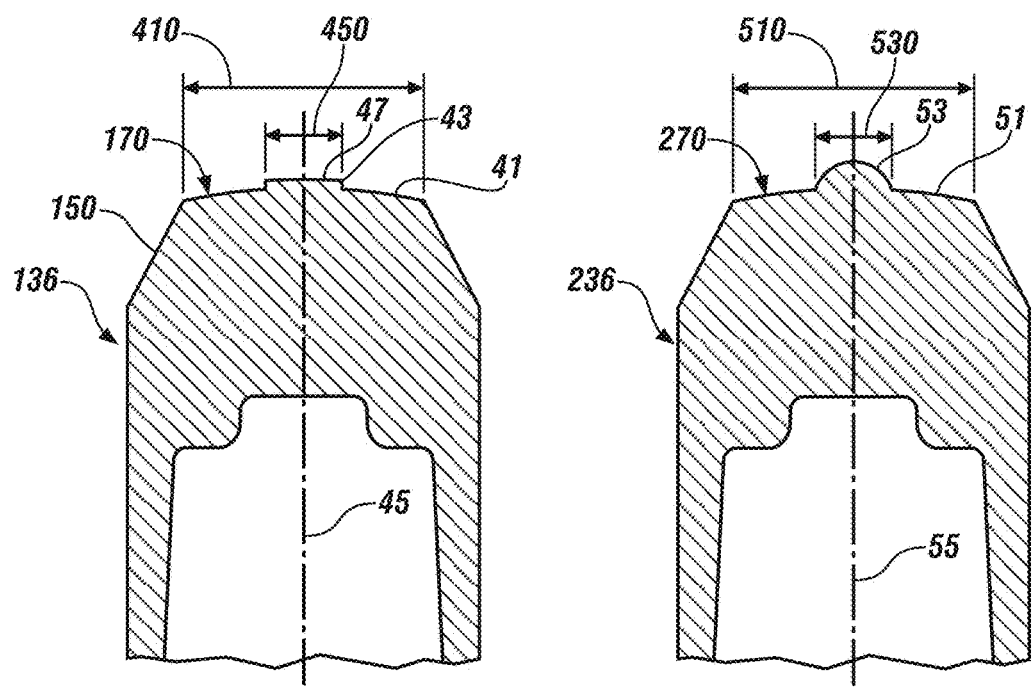
*FIG. 10*  *FIG. 11*

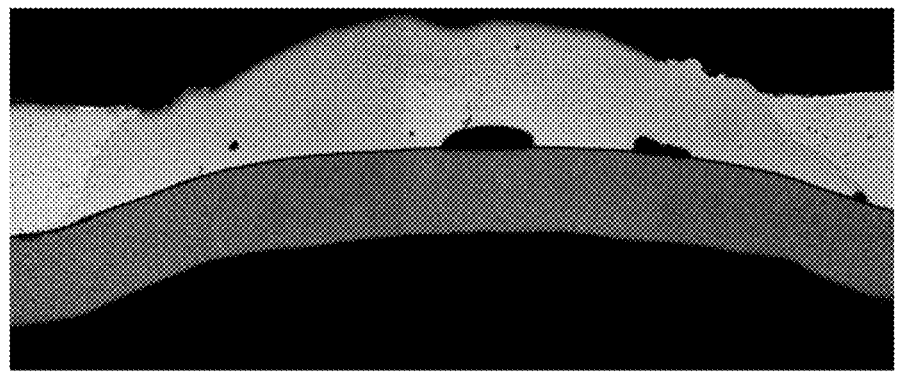
FIG. 12
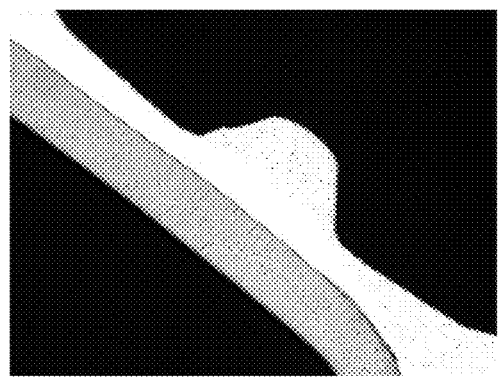
FIG. 13
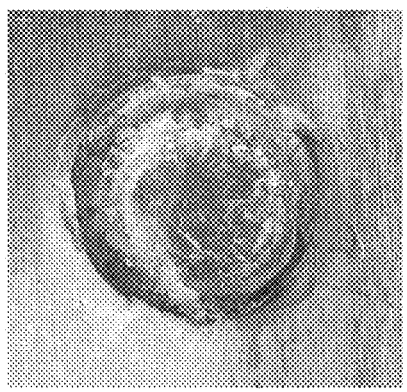     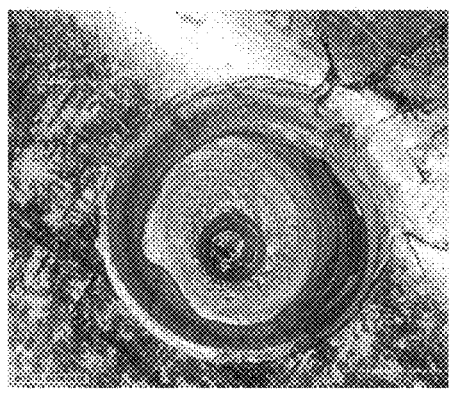
FIG. 14          FIG. 15

ELECTRODE FOR RESISTANCE SPOT WELDING OF DISSIMILAR METALS

TECHNICAL FIELD

The technical field of this disclosure relates generally to resistance spot welding and, more particularly, to resistance spot welding a steel workpiece and an aluminum alloy workpiece.

BACKGROUND

Resistance spot welding is a process used by a number of industries to join together two or more metal workpieces. The automotive industry, for example, often uses resistance spot welding to join together pre-fabricated sheet metal layers during the manufacture of a vehicle body panel for a door, hood, trunk lid, or lift gate, among others. A number of spot welds are typically formed along a peripheral edge of the sheet metal layers or some other bonding region to ensure the body panel is structurally sound. While spot welding has typically been practiced to join together certain similarly-composed metal workpieces—such as steel-to-steel and aluminum alloy-to-aluminum alloy—the desire to incorporate lighter weight materials into a vehicle platform has generated interest in joining steel workpieces to aluminum alloy workpieces by resistance spot welding.

Resistance spot welding, in general, relies on the resistance to the flow of an electrical current through contacting metal workpieces and across their faying interface (i.e., the contacting interface of the metal workpieces) to generate heat. To carry out such a welding process, a pair of opposed spot welding electrodes are typically clamped at diametrically aligned spots on opposite sides of the workpieces at a predetermined weld site. An electrical current is then passed through the metal workpieces from one electrode to the other. Resistance to the flow of this electrical current generates heat within the metal workpieces and at their faying interface. When the metal workpieces being welded are a steel workpiece and an aluminum alloy workpiece, the heat generated at the faying interface initiates a molten weld pool in the aluminum alloy workpiece. This molten aluminum alloy weld pool wets the adjacent surface of the steel workpiece and, upon stoppage of the current flow, solidifies into a weld joint. After the spot welding process has been completed, the welding electrodes are retracted from their respective workpiece surfaces, and the spot welding process is repeated at another weld site.

Spot welding a steel workpiece to an aluminum alloy workpiece presents some challenges. These two types of metals have several considerable dissimilarities that tend to disrupt the welding process. Specifically, steel has a relatively high melting point (~1500° C.) and a relatively high resistivity, while the aluminum alloy has a relatively low melting point (~600° C.) and a relatively low resistivity. As a result of these physical differences, the aluminum alloy melts more quickly and at a much lower temperature than steel during current flow. The aluminum alloy also cools down more quickly than steel after current flow has been terminated. Thus, immediately after the welding current stops, a situation occurs where heat is not disseminated symmetrically from the weld site but, rather, is conducted from the hotter steel workpiece through the aluminum alloy workpiece towards the electrode on the aluminum alloy side. The development of a steep thermal gradient between the steel workpiece and the aluminum alloy-side welding electrode is believed to weaken the integrity of the resultant weld joint in two primary ways. First, because the steel workpiece retains heat for a longer duration than the aluminum alloy workpiece after the welding current has stopped, the molten aluminum alloy weld pool solidifies directionally, starting from the region nearest the colder welding electrode associated with the aluminum alloy workpiece and propagating towards the faying interface. A solidification path of this kind tends to force defects—such as gas porosity, shrinkage, micro-cracking, and oxide residue—towards and along the faying interface within the weld joint. Second, the sustained elevated temperature in the steel workpiece causes the growth of brittle Fe—Al intermetallic compounds at and along the faying interface. Having a dispersion of nugget defects together with excessive of Fe—Al intermetallic compounds along the faying interface tends to reduce the peel strength of the weld joint established between the workpieces.

Another notable dissimilarity between the two metals is that the aluminum alloy contains one or more refractory oxide layers (hereafter collectively referred to as "oxide layer") on its surface that are created during mill operations (e.g., annealing, solution treatment, casting, etc.) and environmental exposure. This oxide layer, which is composed primarily of aluminum oxides, is electrically insulating, mechanically tough, and self-healing in air. Such characteristics are not conducive to the mechanics of spot welding a steel workpiece to an aluminum alloy workpiece. In particular, the surface oxide layer raises the electrical contact resistance of an aluminum alloy workpiece—namely, at its faying surface and at its electrode contact point—making it difficult to effectively control and concentrate heat within the aluminum alloy workpiece. The mechanical toughness of the surface oxide layer also hinders wetting of the steel workpiece. The problems posed by the refractory oxide layer on the surface of the aluminum alloy workpiece are further complicated by the fact that the oxide layer can self-heal or regenerate if breached in the presence of oxygen.

Furthermore, in order to obtain a reasonable weld bond area between a steel workpiece and an aluminum alloy workpiece, there is generally the need to employ a weld schedule that specifies higher currents, longer weld times, or both as compared to spot welding steel-to-steel, which can damage the welding electrodes. For example, if a zinc-coated steel workpiece is being spot welded to an aluminum alloy workpiece under these more aggressive weld schedules, the welding electrode in contact with the steel workpiece has a tendency to react with the zinc coating to form a layer of brass. Surface expulsion can also occur at the interface of the steel workpiece and the contacting welding electrode if the applied welding current is too high. For the welding electrode in contact with the aluminum alloy workpiece, excessive penetration of the molten aluminum alloy weld pool can cause pitting and wear on the electrode when extended weld times are used.

SUMMARY

A method for resistance spot welding a stack-up that includes a steel workpiece and an aluminum alloy workpiece is disclosed. The method involves contacting a surface of the steel workpiece and a surface of the aluminum alloy workpiece with opposed welding electrodes at a predetermined weld site. The electrode that contacts the steel workpiece surface is referred to generically as the steel welding electrode and, similarly, the electrode that contacts the aluminum alloy workpiece surface is referred to generically as the aluminum alloy welding electrode. An electrical current of sufficient magnitude and duration (constant or pulsed) is passed between the welding electrodes through the stack-up to initiate and grow a molten aluminum alloy weld pool within the aluminum alloy workpiece and at the faying interface of the workpieces. The electrodes, during this time, indent and impress into their respective workpiece surfaces to form contact patches. Eventually, after the electrical current has ceased, the molten aluminum alloy weld pool cools and solidifies into a weld joint at the faying interface.

The welding electrodes used to pass the electrical current through the stack-up are constructed so that the density of the electrical current is greater in the steel workpiece than in the aluminum alloy workpiece. This difference in current density can be accomplished by passing the electrical current, at least initially, between a weld face of the steel welding electrode and a perimeter region of a weld face of the aluminum alloy welding electrode, which surrounds a depression, such that the sectional area through which the current passes expands radially along the direction from the faying interface towards the aluminum alloy welding electrode. A number of steel and aluminum alloy welding electrode designs can be employed to achieve such an effect. For example, in one embodiment, the perimeter region of the weld face of the aluminum alloy welding electrode may be an annular perimeter base surface that surrounds and delimits the depression. As another example, the perimeter region of the weld face of the aluminum alloy welding electrode may be a ringed projection that rises upwardly from a base surface of the weld face to define the depression on its inside.

The present spot welding method is believed to have a positive effect on the strength and integrity of the weld joint. For one, the indention of the weld face of the aluminum alloy welding electrode into the aluminum alloy workpiece over the course of the spot welding event causes the softened aluminum alloy workpiece to at least partially fill the depression, which results in the formation of a bulge in the aluminum alloy-side contact patch. The perimeter region of the electrode weld face that surrounds the depression, in turn, enhances the plastic deformation of the underlying portion of the aluminum alloy workpiece and encourages relative movement between the workpieces at their faying interface. These actions help fracture and disintegrate the complicating surface oxide layer that may be present at the faying interface on the surface of the aluminum alloy workpiece. Moreover, the different electrical current densities experienced in the steel and aluminum alloy workpieces (greater current density in the steel workpiece) concentrates heat within a smaller zone in the steel workpiece as compared to the aluminum alloy workpiece. The act of concentrating heat within a smaller zone in the steel workpiece—possibly to the extent of initiating a steel weld pool—modifies the radial temperature gradients within the two workpieces to help the molten aluminum alloy weld pool solidify into the weld joint in a more desirable way.

BRIEF DESCRIPTION OF THE DRAWINGS

FIG. 3 is a partial exploded side view of the stack-up and opposed welding electrodes depicted in FIG. 2;

FIG. 4 is a cross-sectional side view of an aluminum alloy welding electrode according to one embodiment;

FIG. 5 is a cross-sectional side view of a steel welding electrode according to one embodiment;

FIG. 9 is a cross-sectional side view of an aluminum alloy welding electrode according to another embodiment for use with the stack-up depicted in FIGS. 1-3;

FIG. 10 is a cross-sectional side view of a steel welding electrode according to another embodiment for use with the stack-up depicted in FIGS. 1-3;

FIG. 11 is a cross-sectional side view of a steel welding electrode according to another embodiment for use with the stack-up depicted in FIGS. 1-3;

FIG. 12 is a photomicrograph of an aluminum alloy workpiece (top) and a steel workpiece (bottom) that have been spot welded together by a pair of welding electrodes that passed a welding current through the aluminum alloy workpiece at a lower current density than the steel workpiece as set forth in the present disclosure;

FIG. 13 is a photomicrograph of an aluminum alloy workpiece (top) and a steel workpiece (bottom) that have been spot welded together by a pair of welding electrodes that passed a welding current through the aluminum alloy workpiece at a lower current density than the steel workpiece as set forth in the present disclosure;

FIG. 14 is a photograph of the result of a peel strength test that was conducted on a spot weld joint formed at the faying interface of an aluminum alloy workpiece and a hot-dip galvanized interstitial-free steel workpiece by way of spot welding process that passed a welding current through the steel and aluminum alloy workpieces at a generally constant current density; and FIG. 15 is a photograph of the result of a peel strength test that was conducted on a spot weld joint formed at the faying interface of an aluminum alloy workpiece and a hot-dip galvanized interstitial-free steel workpiece by way of spot welding process that passed a welding current through the aluminum alloy workpiece at a lower current density than the steel workpiece as set forth in the present disclosure.

DETAILED DESCRIPTION

Figure 1:
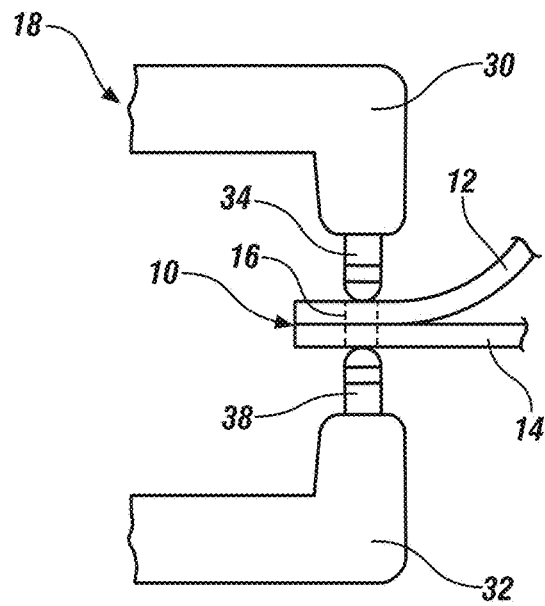
FIG. 1 is a side elevational view of a workpiece stack-up that includes a steel workpiece and an aluminum alloy workpiece assembled in overlapping fashion for resistance spot welding at a predetermined weld site by a welding gun.
Figure 2:
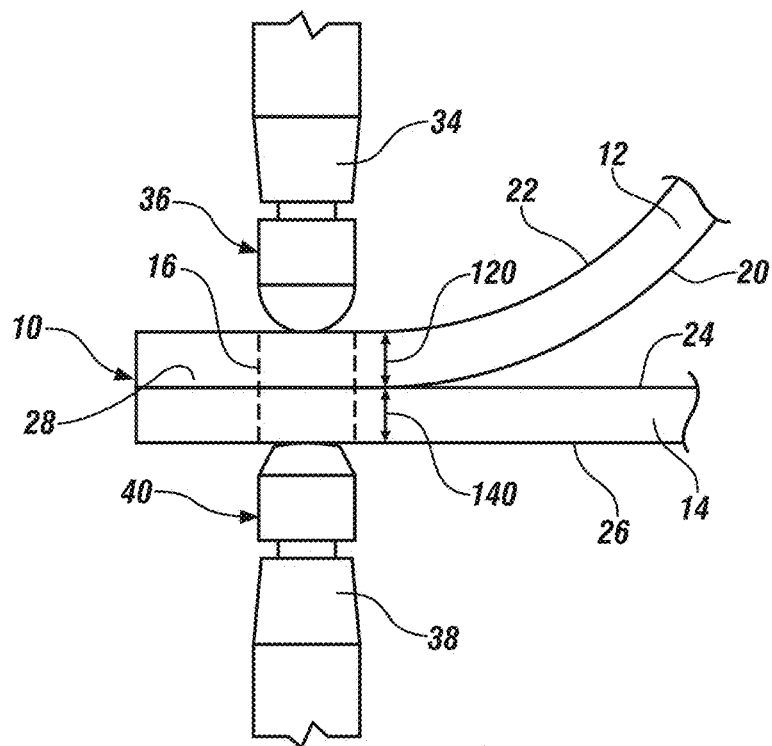
FIG. 2 is a partial magnified view of the stack-up and the opposed welding electrodes depicted in FIG. 1.

FIGS. 1-3 generally depict a workpiece stack-up 10 that includes a steel workpiece 12 and an aluminum alloy workpiece 14. The steel workpiece 12 is preferably a galvanized (zinc-coated) low carbon steel. Other types of steel workpieces may of course be used including, for example, a low carbon bare steel or a galvanized advanced high strength steel (AHSS). Some specific types of steels that may be used in the steel workpiece 12 are interstitial-free (IF) steel, dual-phase (DP) steel, transformation-induced plasticity (TRIP) steel, and press-hardened steel (PHS). Regarding the aluminum alloy workpiece 14, it may be an aluminum-magnesium alloy, an aluminum-silicon alloy, an aluminum-magnesium-silicon alloy, or an aluminum-zinc alloy, and it may be coated with zinc or a conversion coating to improve adhesive bond performance, if desired. Some specific aluminum alloys that may be used in the aluminum alloy workpiece 14 are 5754 aluminum-magnesium alloy, 6111 and 6022 aluminum-magnesium-silicon alloy, and 7003 aluminum-zinc alloy. The term "workpiece" and its steel and aluminum variations is used broadly in the present disclosure to refer to a sheet metal layer, a casting, an extrusion, or any other piece that is resistance spot weldable, inclusive of any surface layers or coatings, if present.

The steel and aluminum alloy workpieces 12, 14 are assembled in overlapping fashion for resistance spot welding at a predetermined weld site 16 by a welding gun 18. When stacked-up for spot welding, the steel workpiece 12 includes a faying surface 20 and an electrode-contacting surface 22. Likewise, the aluminum alloy workpiece 14 includes a faying surface 24 and an electrode-contacting surface 26. The faying surfaces 20, 24 of the two workpieces 12, 14 overlap one another to provide a faying interface 28 at the weld site 16. The faying interface 28, as used herein, encompasses instances of direct contact between the faying surfaces 20, 24 of the workpieces 12, 14 as well as instances where the faying surfaces 20, 24 may not be touching, but are nonetheless in close proximity to one another, such as when a thin layer of adhesive, sealer, or some other intermediate material is present. The electrode-contacting surfaces 22, 26 of the steel and aluminum alloy workpieces 12, 14 generally face away from each other in opposite directions to make them accessible by a pair of opposed spot welding electrodes. Each of the steel and aluminum alloy workpieces 12, 14 preferably has a thickness 120, 140 that ranges from about 0.3 mm to about 6.0 mm, and more preferably from about 0.5 mm to about 4.0 mm, at least at the weld site 16.

The welding gun 18 is usually one part of a larger automated welding operation, and includes a first gun arm 30 and a second gun arm 32 that are mechanically and electrically configured to repeatedly form spot welds in accordance with a defined weld schedule, as is well understood in the art. The first gun arm 30 has a first electrode holder 34 that retains a steel welding electrode 36, and the second gun arm 32 has a second electrode holder 38 that retains an aluminum alloy welding electrode 40. A mechanism for cooling the electrodes 36, 40 with water is typically incorporated into the gun arms 30, 32 and the electrode holders 34, 38 to manage the temperatures of the welding electrodes 36, 40. During spot welding, the welding gun arms 30, 32 are operated to clamp their respective welding electrodes 36, 40 against the oppositely-facing electrode-contacting surfaces 22, 26 of the overlapping steel and aluminum alloy workpieces 12, 14. The first and second welding electrodes 36, 40 are typically pressed against their respective electrode-contacting surfaces 22, 26 in diametric alignment with one another at the intended weld site 16. An electrical current is then delivered from a controllable power source in electrical communication with the welding gun 18 and is passed between the welding electrodes 36, 40 and through the workpieces 12, 14.

The steel welding electrode 36 and the aluminum alloy welding electrode 40 are each formed from an electrically conductive material such as a copper alloy. One specific example is a zirconium copper alloy (ZrCu) that contains about 0.10 wt. % to about 0.20 wt. % zirconium and the balance copper. Copper alloys that meet this constituent composition and are designated C15000 are preferred. Moreover, as will be further explained below, the two welding electrodes 36, 40 are constructed to affect the current density of the electrical current as it passes through the steel and aluminum alloy workpieces 12, 14 during spot welding. In particular, the welding electrodes 36, 40 are constructed so that the current density in the steel workpiece 12 is greater than the current density in the aluminum alloy workpiece 14. This current density variance can be accomplished by passing the electrical current, at least initially, between a weld face of the steel welding electrode 36 and a perimeter region of a weld face of the aluminum alloy welding electrode 40—each of which is being pressed against their respective electrode-contacting surfaces 22, 26 of the workpieces 12, 14—such that the sectional area through which the current passes expands radially along the direction from the faying interface 28 towards the aluminum alloy welding electrode 40.

The difference in current densities within the steel and aluminum alloy workpieces 12, 14 concentrates heat within a smaller zone in the steel workpiece 12 as compared to the aluminum alloy workpiece 14. The weld schedule can even be regulated, if desired, to initiate a molten steel weld pool within the confines of the steel workpiece 12 in addition to initiating a molten aluminum alloy weld pool within the aluminum alloy workpiece 14 and at the faying interface 28. The act of concentrating heat within a smaller zone in the steel workpiece 12—possibly to the extent of initiating a steel weld pool—modifies the temperature gradients, in particular the radial temperature gradients acting in the plane of the workpiece 12, to change the solidification behavior of the aluminum alloy weld pool located at the faying interface 28 so that defects in the ultimately-formed weld joint are forced to a more desirable location. In some instances, especially when a steel weld pool is initiated in the steel workpiece 12, the concentration of heat in the steel workpiece 12 and the resultant thermal gradients can drive weld defects to conglomerate at or near the center of the weld joint at the faying interface 28, which is conducive to better weld joint integrity and peel strength.

The aluminum alloy welding electrode 40 includes a body 42 and a weld face 44, as shown best in FIG. 4. The body 42 defines an accessible hollow recess 46 at one end 48 for insertion of, and attachment with, the second electrode holder 38 in known fashion. A transition nose 50 may extend from an opposite end 52 of the body 42 up to the weld face 44, but is not required to, as the weld face 44 can extend directly from the body 42 to provide what is commonly referred to as a "full-face electrode." The body 42 is preferably cylindrical in shape with a diameter 420 that ranges from about 12 mm to about 22 mm, more preferably from about 16 mm to about 20 mm. The transition nose 50 is preferably frustoconical in shape, although other alternative shapes such as spherical and elliptical may be suitable as well.

The weld face 44 is the portion of the aluminum alloy welding electrode 40 that makes contact with and is impressed, either partially of fully, into the electrode-contacting surface 26 of the aluminum alloy workpiece 14 during spot welding. The weld face 44 has a diameter 440 and a radius of curvature that, together, are sufficient to prevent excessive indentation into the molten aluminum alloy weld pool and the softened workpiece region surrounding the weld pool. Excessive indentation is typically defined as indentation that meets or exceeds 50% of the thickness 140 of the aluminum alloy workpiece 14. Such indentation can be avoided, for example, by providing the weld face 44 with a diameter 440 of about 6 mm to 12 mm and a radius of curvature of about 15 mm to about 300 mm. In a preferred embodiment, the diameter 440 of the weld face 44 is about 8 mm to about 12 mm and the radius of curvature is about 20 mm to about 150 mm. Additionally, if desired, the weld face 44 can be textured or have surface features such as those described in U.S. Pat. Nos. 6,861,609, 8,222,560, 8,274,010, 8,436,269, and 8,525,066, and U.S. Patent Application Publication No. 2009/0255908.

Figure 4A:
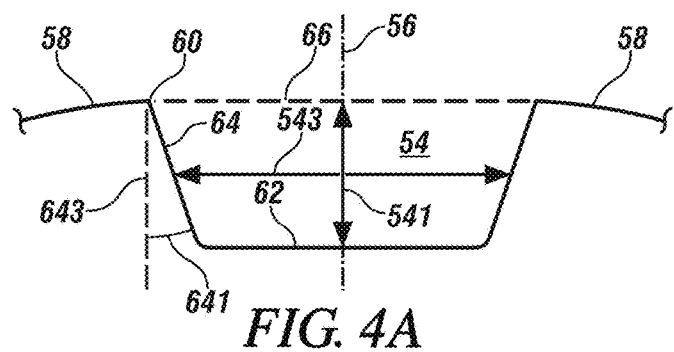
FIG. 4A is a partial magnified cross-sectional view of the weld face of the aluminum alloy welding electrode depicted in FIG. 4.

The weld face 44 includes a depression 54 located about a central axis 56 of the weld face 44, as shown in FIGS. 4-4A. It also includes an annular perimeter base surface 58 that surrounds and delimits an opening 60 of the depression 54 without interruption and also provides the weld face 44 with its specified radius of curvature. In this particular embodiment, as shown, the depression 54 is defined by a bottom 62 and a continuous peripheral side wall 64 that connects the bottom 62 with the annular perimeter base surface 58 at the opening 60. The bottom 62 can be flat, but does not necessarily have to be, and is displaced downward from an imaginary plane 66 that spans the opening 60 to provide the depression 54 with a depth 541. A width 543 of the depression 54—which is measured at the greatest distance across the depression 54 perpendicular to the depth 541 at any particular depth between the imaginary plane 66 at the top of the depression 54 and the bottom 62—is provided by the peripheral side wall 64 and may be constant or variable along the depth 541. The depression 54 can be formed with its depth 541 and width 543 in the weld face 54 by any suitable technique such as, for example, the use of a matching rotary cutting blade.

The size of the annular perimeter base surface 58 and the depression 54 are tailored to support the formation of a strong and durable weld joint between the steel and aluminum alloy workpieces 12, 14. The annular perimeter base surface 58, for instance, has a contacting area that is sufficient to support the aluminum alloy welding electrode 40 on the electrode-contacting surface 26 of the aluminum alloy workpiece 12 such that rapid indentation of the weld face 44 into the workpiece 12 is prevented at the onset of current flow. To accomplish this balance of current exchange and electrode support, the annular perimeter base surface 58 preferably has a continuous area of at least 28 mm² distributed evenly around the depression 54 that contacts the electrode-contacting surface 26 of the aluminum alloy workpiece 12 at the start of current flow. In a more preferred embodiment, the continuous and evenly distributed contacting area of the annular perimeter base surface 58 is at least 50 mm².

The depth 543 of the depression 54 preferably ranges from about 0.1 mm up to about 3.0 mm and, more preferably, from about 0.3 mm to no greater than the thickness 140 of the aluminum alloy workpiece 14, and its width 543 at the opening 60 preferably ranges from about 2 mm to about 10 mm and, more preferably, from about 3 mm to about 8 mm. The peripheral side wall 64, moreover, is preferably tapered toward the bottom 62 so that the width 543 of the depression 54 decreases from the opening 60 to the bottom 62 to help ensure easy release and retraction of the aluminum alloy welding electrode 14 from the electrode-contacting surface 26 of the aluminum alloy workpiece 14. This taper has a draft angle 641 that is preferably greater than about 3° and, more preferably, greater than about 10°. The draft angle 641, as shown, is the angle between the peripheral side wall 64 and a line 643 that is parallel to the central axis 56 of the weld face 44 and intersects the point where the peripheral side wall 64 meets the annular perimeter base surface 58 at the opening 60 when the weld face 44 of the aluminum alloy welding electrode 40 is viewed in cross-section. In one specific example, as illustrated generally in FIGS. 4-4A, the depression 54 is frustoconical in cross-sectional shape and is defined by a depth 541 of about 0.3 mm to about 1.5 mm, a diameter at the opening 60 of about 3 mm to about 8 mm, a draft angle 641 of the peripheral side wall 64 of about 10°, and a diameter at the bottom 62 of about 2.9 mm to about 7.5 mm.

Figure 4B:
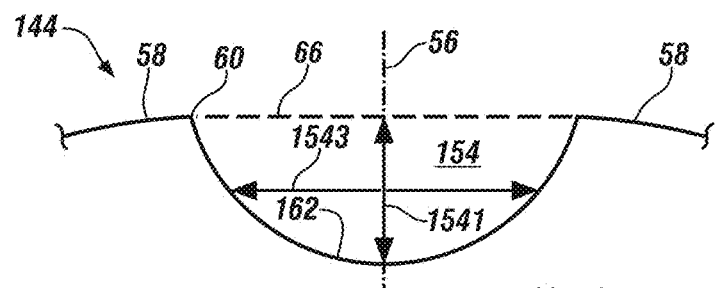
FIG. 4B is a partial magnified cross-sectional view of another embodiment of the depression included on the weld face of the aluminum alloy welding electrode depicted in FIG. 4.

The shape of the depression 54 can vary from the specific embodiment shown in FIGS. 4-4A while still achieving the same objective as will be appreciated by those skilled in the art. The depression, for example, identified by reference numeral 154, can include a rounded bottom 162 in lieu of the peripheral side wall 64 and the flat bottom 62, as shown in FIG. 4B. The rounded bottom 162 connects with the annular perimeter base surface 58 at the opening 60 of the depression 154 and is displaced downward from the imaginary plane 66 that spans the opening 60 to provide the depression 154 with a variable depth 1541 and a variable width 1543. The depth 1541 is typically greatest at the center of the depression 154, which is usually co-axial with the central axis 58 of the weld face 144, and the width 1543 is typically greatest at the opening 60 of the depression 154. The preferred maximum depth 1541 and width 1543 of the depression 54 at those locations are the same as before (depth: 0.1 mm to 3.0 mm and, more preferably, from 0.3 mm to no greater than the thickness of the aluminum alloy workpiece 14; width: about 2 mm to about 10 and, more preferably, from about 3 mm to about 8 mm). The rounded bottom 162, if spherically concave, also preferably has a minimum radius of curvature of greater than about one-half (50%) the width 1543 of the depression 154 at its opening 60.

The steel welding electrode 36 can be any electrode suitable for spot welding steel. Referring now to FIG. 5, one particular embodiment of the steel welding electrode 36 includes a body 68 and a weld face 70. The body 68 defines a hollow recess 74 accessible at one end 76 for insertion of, and attachment with, the first electrode holder 34 in known fashion. A transition nose 78 of spherical shape may extend from an opposite end 80 of the body 68 up to the weld face 70, if desired, to provide what is commonly referred to as a ball-nose electrode. The body 68 is preferably cylindrical in shape with a diameter 680 that ranges from about 12 mm to about 22 mm, more preferably from about 16 mm to about 20 mm. The transition nose 78, while shown and described as being spherical, is not so limited and can assume other shapes such as elliptical and frustoconical. As for the weld face 70, it, like before, is the portion of the steel welding electrode 36 that makes contact with and is impressed either partially or fully into the electrode-contacting surface 22 of the steel workpiece 12 during spot welding. The weld face 70 of the steel welding electrode 36 has a diameter 700 that ranges from about 4 mm to about 12 mm, more preferably about 5 mm to about 9 mm, and is planar or radiused. The weld face 70, if radiused, may have a radius of curvature of about 8 mm or greater.

FIGS. 1-2 and 6-8 illustrate a spot welding process in which the stack-up 10 is spot-welded at the weld site 16 using the welding electrodes 36, 40 described above in FIGS. 4-4A and 5. The welding gun 18 (partially shown) is configured to provide the electrical current and contact pressure needed to spot weld together the steel workpiece 12 and the aluminum workpiece 14. The gun arms 30, 32 of the welding gun 18 may be stationary (pedestal welder) or robotically moveable, as is customary in the art, and are operated during spot welding to contact and press the welding electrodes 36, 40 against the oppositely-facing electrode-contacting surfaces 22, 26 of the steel and aluminum workpieces 12, 14 in diametric alignment with one another at the weld site 16. The clamping force assessed by the gun arms 30, 32 helps establish good mechanical and electrical contact between the welding electrodes 36, 40 and their respective electrode-contacting surfaces 22, 26.

Figure 6:
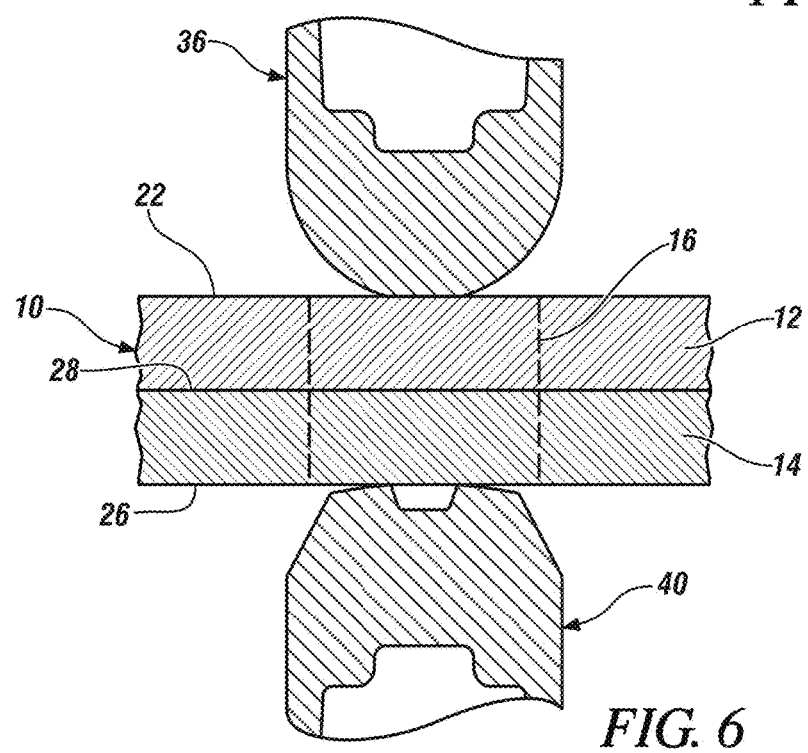
FIG. 6 is a partial cross-sectional view of the stack-up before passage of the welding current in which the steel welding electrode is contacting an electrode-contacting surface of the steel workpiece and an aluminum alloy welding electrode is contacting an electrode-contacting surface of the aluminum alloy workpiece.

The resistance spot welding process begins by locating the stack-up 10 between the steel and aluminum alloy welding electrodes 36, 40 so that the weld site 16 is generally aligned with the opposed weld faces 70, 44. This is shown in FIGS. 1, 2, and 6. The workpiece stack-up 10 may be brought to such a location, as is often the case when the gun arms 30, 32 are part of a stationary pedestal welder, or the gun arms 30, 32 may be robotically moved to locate the electrodes 36, 40 relative to the weld site 16. Once the stack-up 10 is properly located, the first and second gun arms 30, 32 converge relative to one another to contact and press the weld faces 70, 44 of the steel welding electrode 36 and the aluminum alloy welding electrode 40 against the oppositely-facing electrode-contacting surfaces 22, 26 of the steel and aluminum alloy workpieces 12, 14 at the weld site 16, as shown in FIG. 6. The contact pressure imparted by the welding electrodes 36, 40 causes the weld face 70 of the steel welding electrode 36 to begin to indent into the electrode-contacting surface 22 of the steel workpiece 12 and, likewise, the weld face 44 of the aluminum alloy welding electrode 40—in particular annular perimeter base surface 58—to begin to indent into the electrode-contacting surface 26 of the aluminum alloy workpiece 14.

An electrical current—typically a DC current between about 5 kA and about 50 kA—is then passed between the weld faces 70, 44 of the steel and aluminum alloy welding electrodes 36, 40 and through the stack-up 10 at the weld site 16 in accordance with an appropriate weld schedule. The electrical current is typically passed as a constant current or a series of current pulses for a period of about 40 milliseconds to about 1000 milliseconds. During welding current flow, the construction of the aluminum alloy welding electrode 40 causes the electrical current to have a lower current density in the aluminum alloy workpiece 14 than in the steel workpiece 12. This occurs because the depression 54 acts as an electrically insulative void at the middle of the weld face 44. An electrically insulative void of this kind causes the electrical current to pass through the annular perimeter base surface 58 of the weld face 44 over a broader sectional area within the aluminum alloy workpiece 14 than it otherwise would if no depression 54 was present. The steel welding electrode 36, on the other hand, passes the welding current through a more concentrated sectional area within the steel workpiece 12 as a result of the more conventional structure of its weld face 70.

Figure 7:
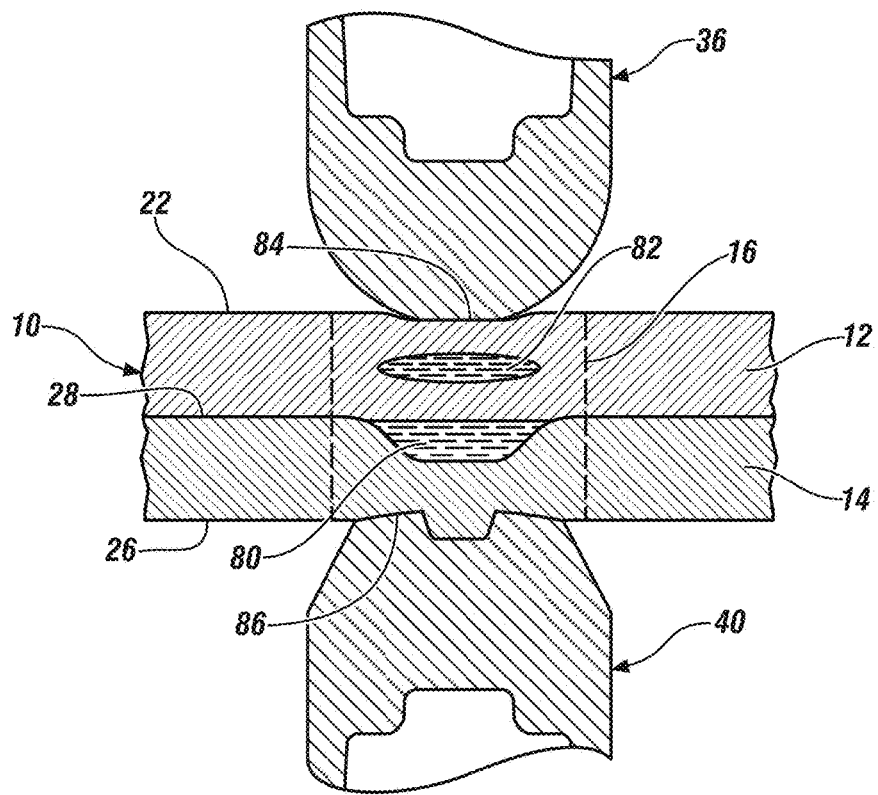
FIG. 7 is a partial cross-sectional view of the stack-up during spot welding in which a molten aluminum alloy weld pool has been initiated within the aluminum alloy workpiece and at the faying interface and, additionally, a molten steel weld pool has been initiated within the steel workpiece.

The passage of the electrical current at different current densities through the workpieces 12, 14 is considered to be at least partially responsible for a series of metallurgical events that synergistically improve the spot weldability of the workpieces 12, 14. Passage of the electrical current through the workpieces 12, 14 initially causes the steel workpiece 12 to heat up more quickly than the aluminum alloy workpiece 14 since it has a higher resistivity. This heat imbalance—which becomes magnified due to the electrical current being more concentrated in the steel workpiece 12—causes a temperature gradient to become established in both the steel workpiece 12 and the aluminum alloy workpiece 14. The flow of heat down the temperature gradient toward the water-cooled aluminum alloy welding electrode 40, in conjunction with the generated heat that results from the resistance to the flow of the electrical current across the faying interface 28, eventually melts the aluminum alloy workpiece 14 and forms a molten aluminum alloy weld pool 80, as depicted in FIG. 7, which then wets the faying surface 20 of the steel workpiece 12.

Other metallurgical events also occur within the stack-up 10 while the molten aluminum alloy weld pool 80 is being initiated and grown. Most notably, the increased current density in the steel workpiece 12 during current flow results in a more concentrated heat zone within the steel workpiece 12 (as compared to the aluminum alloy workpiece 13) that can improve the integrity and peel strength of the final weld joint, as will be discussed below in more detail. The concentrated heat zone can—but does not necessarily have to—initiate and grow a molten steel weld pool 82 within the confines of the steel workpiece 12 as depicted in FIG. 7, as well. The molten steel weld pool 82 is more likely to be initiated and grown when a weld schedule that calls for more aggressive electrical currents and/or longer weld times is employed. Such a weld schedule has a better chance of being successfully performed here without softening the aluminum alloy workpiece 14 too much because of the decreased current density experienced in that workpiece 14.

Additionally, during current flow and for a very short period afterwards, the weld faces 70, 44 of the steel welding electrode 36 and the aluminum alloy welding electrode 40 continue to indent farther into their respective electrode-contacting surfaces 22, 26. The resultant impressed indentations 84, 86 are known as contact patches. The weld face 44 of the aluminum alloy welding electrode 40 may undergo greater indentation than its steel counterpart due to the fact that aluminum alloy is softer than steel and has a lower melting point. The indention of the weld face 44 of the aluminum alloy welding electrode 40 over the course of the spot welding event has a favorable implication: it causes the softened aluminum alloy workpiece 14 to partially or completely fill the depression 54. This in turn enhances the plastic deformation of the aluminum alloy workpiece 14 underneath the annular perimeter base surface 58 and encourages relative movement between the workpiece faying surfaces 20, 24 at the weld site 16. When plastic deformation and relative movement are affected in this way, the surface oxide layer present on the faying surface 24 of the aluminum alloy workpiece 14 tends to fracture and disintegrate, which facilitates wetting of the steel workpiece 12 at its faying surface 20 by the molten aluminum alloy weld pool 80.

Figure 8:
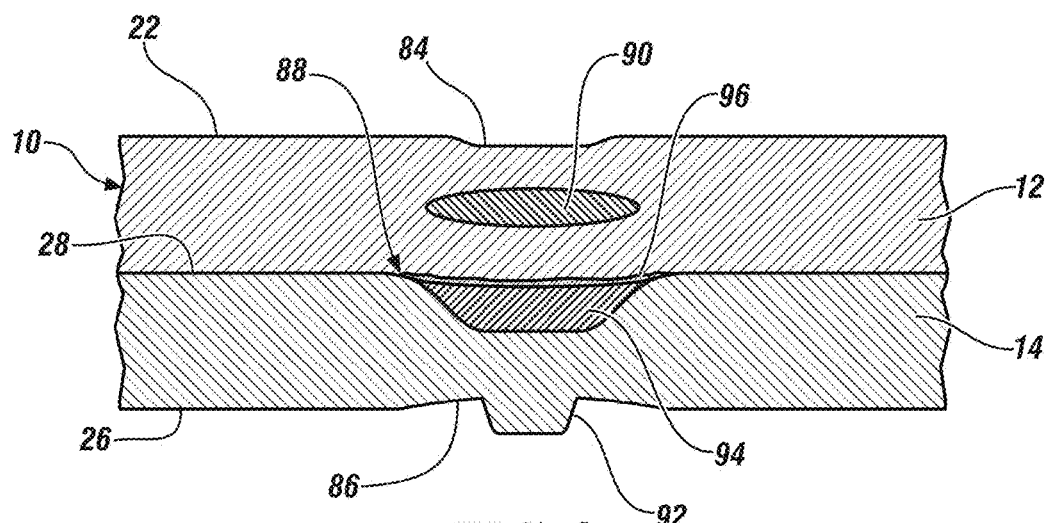
FIG. 8 is a partial cross-sectional view of the stack-up after stoppage of the welding current and refraction of the welding electrodes in which a weld joint has been formed at the faying interface and a steel weld nugget has been formed within the steel workpiece.

Upon cessation of the welding current, the molten aluminum alloy weld pool 80 solidifies to form a weld joint 88 at the faying interface 28, as illustrated generally in FIG. 8. The steel weld pool 82, if formed, likewise solidifies at this time into a steel weld nugget 90 within the steel workpiece 12, although it preferably does not extend to either the faying surface 20 or the electrode-contacting surface 22 of that workpiece 12. The welding electrodes 36, 40 are eventually retracted from the weld site 16 and re-positioned at another weld site to conduct a similar spot welding process. The retraction of the aluminum alloy welding electrode 40 leaves behind a bulge 92 on the electrode-contacting surface 26 of the aluminum alloy workpiece 14 where the depression 54 was positioned. The bulge 92, consequently, is located within the impressed contact patch 86 formed by the weld face 44 of the aluminum alloy welding electrode 40 and is generally smaller in average cross-sectional area than the weld joint 88. Weld defects tend to gather underneath and within the bulge 92 away from the faying interface 28. Directing the weld defects to such a location is believed to have a positive impact on the strength of the weld joint 88.

The weld joint 88 includes an aluminum alloy weld nugget 94 and, typically, a Fe—Al intermetallic layer 96. The aluminum alloy weld nugget 94 penetrates into the aluminum alloy workpiece 14 to a distance that preferably ranges from about 20% to about 80% of the thickness 140 of the aluminum alloy workpiece 14, although in some instances it may penetrate through the entire thickness 140 (i.e., 100%) of the workpiece 14. The Fe—Al intermetallic layer 96 is situated between the aluminum alloy weld nugget 94 and the steel workpiece 12. This layer is generally formed as a result of aluminum diffusion from the aluminum alloy weld pool 80 into the steel workpiece 12 during current flow and for a short period of time after current flow when the steel workpiece 12 is still hot. It can include $FeAl_3$, $Fe_2Al_5$, $Fe_2Al_7$ and other compounds. When measured in the direction of welding current flow, the Fe—Al intermetallic layer 96 may be about 1 µm to about 3 µm thick in at least the center of the weld joint 88 underneath the bulge 92, which is generally thinner than what is normally observed.

The formation of a concentrated heat zone in the steel workpiece 12—as compared to the aluminum alloy workpiece 14—is believed to improve the strength and integrity of the weld joint 88 in at least one of two ways. First, the concentrated heat zone within the steel workpiece 12 changes the temperature distribution through the weld site 16 by creating radial temperature gradients within the plane of the workpiece 12 which, in turn, cause the molten aluminum alloy weld pool 80 to solidify from its cooler outer perimeter towards its center. This solidification behavior drives weld defects away from the nugget perimeter and toward the center of the weld joint 88 where they are less prone to weaken the joint 88 and interfere with its structural integrity. Second, in instances where the steel weld pool 82 is initiated, the faying surface 20 of the steel workpiece 12 tends to distort away from the electrode-contacting surface 22. Such distortion can cause the steel workpiece 12 to thicken at the weld site 16 by as much as 50%. Increasing the thickness of the steel workpiece 12 in this way helps maintain an elevated temperature at the center of the molten aluminum alloy weld pool 80—allowing it to cool and solidify last—which can further increase radial temperature gradients and drive weld defects towards the center of the weld joint 88. The swelling of the faying surface 20 of the steel workpiece 12 can also disrupt the intermetallic compounds that tend to form along the interface 20 and, once the joint is in service, interfere with crack growth along the faying interface 28 by deflecting cracks along a non-preferred path.

Other welding electrode constructions, besides the specific embodiments of the steel and aluminum alloy welding electrodes 36, 40 shown in FIGS. 4-5, can be used to spot weld the stack-up 10 in a similar fashion (i.e., by decreasing the current density of the welding current within the aluminum alloy workpiece 14 by passing the electrical current through a perimeter region of the weld face of the aluminum alloy welding electrode so as to expand the sectional area through which the electrical current passes along the direction from the faying interface 28 to the aluminum alloy welding electrode 40). One such variation of the aluminum alloy welding electrode, identified by reference numeral 140, is shown in FIG. 9. Variations of the steel welding electrode, identified by reference numerals 136 and 236, are shown in FIGS. 10 and 11, respectively. There is no limitation as to which electrodes can be used together. Any of the aluminum alloy welding electrodes 40, 140 can be used with any of the steel welding electrodes 36, 136, 236, as well as other variations not explicitly described here, to spot weld the workpiece stack-up 10 in the manner described above.

The aluminum alloy welding electrode 140 shown in FIG. 9 is constructed the same as the electrode 40 shown in FIG. 4 except for the weld face, which is identified here as reference numeral 244. The weld face 244 includes a ringed projection 31 that surrounds a central axis 256 of the weld face 244. The ringed projection 31 has a diameter 310 and rises upwardly from a base surface 33 of the weld face 244 to define a depression 254 on its inside. This depression 254 functions similarly to the depressions 54, 154 in FIGS. 4-4A and 4B in that it acts as an insulative void at the middle of the weld face 244 during at least the initial moments of electrical current flow. Additionally, also like before, the continued impression of the weld face 244 into the electrode-contacting surface 26 during current flow causes the softened aluminum alloy workpiece to at least partially fill the depression 254. The resultant increase in plastic deformation of the aluminum alloy workpiece 14 underneath the ringed ridge 31 and the encouragement of relative movement between the workpiece faying surfaces 20, 24 at the weld site 16 helps fracture and disintegrate the surface oxide layer present on the faying surface 24 of the aluminum alloy workpiece 14.

The base surface 33 of the weld face 244 has the same radiused profile on both the inside and outside of the ringed projection 31 and provides the weld face 244 with its specified radius of curvature (e.g., between about 15 mm and about 300 mm). The ringed projection 31 has a top planar surface 35 that is elevated above the base surface 33 to a height 311. This planar surface 35, like before, provides a continuous area distributed evenly around the depression 54 that contacts the electrode-contacting surface 26 of the aluminum alloy workpiece 12 at the start of current flow so that rapid indentation of the weld face 44 into the workpiece 12 is prevented. The contacting area provided by the flat surface 35 on the onset of current flow is preferably at least 28 $mm^2$ and, more preferably, at least 50 $mm^2$. In one particular embodiment, for example, the ringed projection 31 has a diameter 310 that ranges from about 2 mm to about 10 mm, more preferably from about 3 mm to about 8 mm, and a height 311 that ranges from about 0.1 mm to about 3 mm, more preferably from about 0.2 mm to about one-half (50%) the thickness 140 of the aluminum alloy workpiece 140.

While the shape of the depression 254 shown here in FIG. 9 may differ somewhat from the shape of the depressions 54, 154 in FIGS. 4-4A and 4B, all of the depressions 54, 154, 254 will nonetheless promote plastic deformation of the aluminum alloy workpiece 14 and encourage relative movement between the workpiece faying surfaces 20, 24 at the weld site 16 in a way that helps fracture and disintegrate the surface oxide layer present on the faying surface 24 of the aluminum alloy workpiece 14. Each of the depressions 54, 154, 254 will also become at least partially filled, and oftentimes completely filled, with the softened aluminum alloy workpiece 14 during indentation of their weld faces 44, 144, 244 into the electrode-contacting surface 26 when the electrical current is being passed during spot welding. The resultant bulge that is formed by the weld faces 44, 144, 244 will have a similar impact on the weld joint 88 formed between the two workpieces 12, 14 even though its shape may vary as a result of the different sizes and shapes of the depressions 54, 154, 254 that are included on those various weld faces 44, 144, 244.

The welding electrode shown in FIG. 10 has the same basic components as the steel welding electrode 36 shown in FIG. 5 with the exception of two main differences. First, the steel welding electrode 136 includes—but does not necessarily have to include—a transition nose 150 that is frustoconical in shape. Second, the steel welding electrode 136 includes a weld face 170 that has a base surface 41 and a plateau 43 that ascends above the base surface 41 and is preferably centered about a central axis 45 of the weld face 170. The base surface 41 of the weld face 170 has a diameter 410 of about 6 mm to about 12 mm and a radius of curvature of about 20 mm to about 100 mm. The plateau 43 has a plateau surface 47 that is positively displaced from the base surface 41 by about 0.1 mm to about 0.5 mm. The plateau surface 47 has a diameter 450 of about 3 mm to about 7 mm and is flatter than the base surface 41 of the weld face 170—the plateau surface 47 preferably being planar or having a radius of curvature of about 40 mm or greater. When substituted for the steel welding electrode 36 shown in FIG. 5 as part of the spot welding process described above, the plateau surface 47 of the plateau 43 makes contact and impresses into the electrode-contacting surface 22 of the steel workpiece 12. The relative hardness of the steel workpiece 12, however, generally keeps the surrounding weld face 41 from making contact and impressing into the electrode-contacting surface 22.

The steel welding electrode shown in FIG. 11 has the same basic components as the steel welding electrode 136 shown in FIG. 10 with the exception of one main difference. That is, the steel welding electrode 236 shown here includes a radiused weld face 270 that has a base surface 51 and a rounded projection 53 that ascends above the base surface 51 and is preferably centered about a central axis 55 of the weld face 270. The base surface 51 of the weld face 270 has a diameter 510 of about 6 mm to about 12 mm and a radius of curvature of about 20 mm to about 100 mm. The rounded projection 53 is preferably spherical shaped with a diameter 530 at the base surface 51 that ranges from about 3 mm to about 7 mm and a radius of curvature that ranges from about 8 mm to about 20 mm. When substituted for the steel welding electrode 36 shown in FIG. 5 as part of the spot welding process described above, the rounded projection 53 indents into the electrode-contacting surface 22 of the steel workpiece 12 to form a sharper contact patch 84. It is possible that the sharper contact patch 84 attributed to the rounded projection 53 may increase the current density within the steel workpiece 12 and create steeper radial thermal gradients relative the flatter weld face 70 of the previously-described steel welding electrode 36.

EXAMPLE

These Examples demonstrate methods of spot welding a steel workpiece and an aluminum alloy workpiece in accordance with the above disclosure. In the first example, a 1.2 mm thick 6022 aluminum alloy workpiece (top) was resistance spot welded to a 1.0 mm thick hot-dip galvanized low carbon steel workpiece (bottom). The welding electrode used on the aluminum alloy side resembled the electrode shown in FIG. 4 and the welding electrode used on the steel side resembled the electrode shown in FIG. 5. The two electrodes were brought into contact with their respective opposed workpiece surfaces and an electrical current was exchanged between them for a time sufficient to achieve a weld joint at the faying interface of the workpieces. In this case, a 19 kA electrical current was applied for a period of about 500 ms under a weld force of about 800 lb. A molten steel weld pool was not initiated and grown within the steel workpiece in this particular example as demonstrated by the lack of any pronounced thickening of the steel workpiece at the weld site.

A photomicrograph of the cross-section of the weld joint was taken and is shown in FIG. 12. The bulge that was produced as a result of the depression in the aluminum alloy welding electrode is plainly visible within the contact patch (only partially shown) on the aluminum alloy workpiece. Underneath the bulge and along the faying interface is the weld joint. A conglomerate of weld defects can be seen near and around the center of the weld joint extending upwards from the faying interface. The conglomerate of weld defects is believed to be the result of the different current densities established in the workpieces (lower current density in the aluminum alloy workpiece) and the effect that the different current densities had on the solidification behavior of the molten aluminum alloy weld pool. Congregating the weld defects in one interior location—as opposed to the weld defects being spread out at and along the faying interface—is thought to favorably contribute to the strength of the weld joint. For instance, the peel strength of the weld joint shown in FIG. 12 was found to be about 75 lb, which is much greater than the 20 lb peel strength that was observed for a weld joint (between similar steel and aluminum alloy workpieces) produced by conventional welding electrodes in which the aluminum alloy welding electrode did not include a weld face that had a perimeter region surrounding a depression as described above.

In a second example, a 1 mm thick 6111 aluminum alloy workpiece (top) was resistance spot welded to a 0.8 mm thick hot-dip galvanized interstitial-free steel workpiece (bottom). The welding electrode used on the aluminum alloy side resembled the electrode shown in FIG. 4 and the welding electrode used on the steel side resembled the electrode shown in FIG. 5. The two electrodes were brought into contact with their respective opposed workpiece surfaces and an electrical current was exchanged between them for a time sufficient to achieve a weld joint at the faying interface of the workpieces. Here, a 20 kA electrical current was applied for a period of about 300 ms under a weld force of about 800 lb. A molten steel weld pool was not initiated and grown within the steel workpiece in this particular example as demonstrated by the lack of any pronounced thickening of the steel workpiece at the weld site.

A photomicrograph of the cross-section of the weld joint was taken and is shown in FIG. 13. The bulge that was produced as a result of the depression in the aluminum alloy welding electrode is plainly visible within the contact patch on the aluminum alloy workpiece. Underneath the bulge and along the faying interface is the weld joint. In this Example, the portion of the Fe—Al intermetallic layer underneath the bulge was measured and observed to be about 1 μm to about 3 μm thick, which is generally thinner than what is normally expected to be observed when spot welding steel and aluminum alloy workpieces. Without being bound by theory, it is believed that the reduced-thickness of the central portion of the Fe—Al intermetallic layer along with the changes to the solidification behavior of the molten aluminum alloy weld pool, which were caused by the lower welding current density in the aluminum alloy workpiece, contributed to the strength of the weld joint. Specifically, the weld joint was tested to have a weld strength of 546 lb in shear. Such shear strength of the weld joint is significantly greater than the minimum required shear strength of 300 lb as specified by SAE aerospace material specification AMS-W-6858A for an aluminum alloy workpiece of the same gauge.

The practical strength of the weld joint is demonstrated in FIGS. 14-15. Each of those Figures shows the result of a peel strength test that was conducted on a spot weld joint formed at the faying interface of a 1 mm thick 6111 aluminum alloy workpiece and a 0.8 mm thick hot-dip galvanized interstitial-free steel workpiece. The particular post-peel strength test observations that were performed here entailed examining the area in and around the weld joint after the two spot-welded workpieces had been peeled apart to get a sense of the strength and integrity of the weld joint. The photograph shown in FIG. 14 was from a weld joint formed by a spot welding technique in which the electrical current that was passed through the steel and aluminum alloy workpieces was maintained at a generally constant current density and a bulge was not formed within the contact patch on the aluminum alloy side. The observed result of the peel strength test in that instance was interfacial failure of the weld joint. Interfacial failure occurs when the weld joint breaks at the faying interface and allows the two workpieces to be easily pulled apart.

The photograph shown in FIG. 15, on the other hand, was from a weld joint formed in accordance with the above disclosure. The result of the peel strength test in that instance indicated that the weld joint was stronger than the one associated with FIG. 14. This conclusion is supported by the fact that the weld joint did not break and suffer interfacial failure; rather, the aluminum alloy workpiece was torn around the edge of weld joint and an aluminum alloy weld button remained metallurgically joined to the faying surface of the steel workpiece by way of the weld joint. In other words, when the two workpieces were pulled apart, the weld joint was strong enough to maintain its metallurgical bond and to tear out a piece of the aluminum alloy workpiece. Indeed, the bulge that was formed on the surface of the aluminum alloy workpiece by the aluminum alloy welding electrode can still be seen in FIG. 15 on the aluminum alloy weld button that was left behind.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of spot welding a workpiece stack-up that includes a steel workpiece and an aluminum alloy workpiece, the method comprising:
    providing a stack-up that includes a steel workpiece and an aluminum alloy workpiece that overlap to provide a faying interface;
    contacting a weld face of a steel welding electrode with a surface of the steel workpiece;
    contacting a weld face of an aluminum alloy welding electrode with a surface of the aluminum alloy workpiece, the weld face of the aluminum alloy welding electrode comprising a depression and a perimeter region surrounding the depression, the perimeter region providing the weld face of the aluminum alloy welding electrode with a radius of curvature of 15 mm to 300 mm; and
    passing an electrical current between the steel welding electrode and the aluminum alloy welding electrode to initiate and grow a molten aluminum alloy weld pool within the aluminum alloy workpiece that wets the steel workpiece at the faying interface, the electrical current at least initially passing through the perimeter region of the aluminum alloy welding electrode such that a sectional area through which the electrical current passes expands radially from the faying interface of the steel and aluminum alloy workpieces to the aluminum alloy welding electrode.

2. The method set forth in claim 1, wherein the perimeter region of the weld face of the aluminum alloy welding electrode comprises an annular perimeter base surface that surrounds and delimits the depression.

3. The method set forth in claim 2, wherein the depression is defined by a bottom and a tapered peripheral side wall that connects the bottom with the annular perimeter base surface at an opening of the depression.

4. The method set forth in claim 2, wherein the depression is defined by a concave bottom that connects with the annular perimeter base surface at an opening of the depression.

5. The method set forth in claim 2, wherein the depression is located about a central axis of the weld face of the aluminum alloy welding electrode.

6. The method set forth in claim 1, wherein the perimeter region of the weld face of the aluminum alloy welding electrode comprises a ringed projection that rises upwardly from a base surface of the weld face to define the depression on its inside.

7. The method set forth in claim 6, wherein the ringed projection has a planar surface that is elevated above the base surface.

8. The method set forth in claim 6, wherein the depression is located about a central axis of the weld face of the aluminum alloy welding electrode.

9. The method set forth in claim 1, wherein passing the electrical current between the steel welding electrode and the aluminum alloy welding electrode causes the aluminum alloy workpiece to at least partially fill the depression as the weld face of the aluminum alloy welding electrode impresses into the surface of the aluminum alloy workpiece.

10. The method set forth in claim 1, further comprising:
    stopping the electrical current such that the molten aluminum alloy weld pool solidifies into a weld joint at the faying interface of the steel and aluminum alloy workpieces.

11. The method set forth in claim 10, wherein the weld joint comprises an aluminum alloy weld nugget and a Fe—Al intermetallic layer between the aluminum alloy weld nugget and the steel workpiece.

12. The method set forth in claim 1, wherein passing the electrical current between the steel welding electrode and the aluminum alloy welding electrode additionally initiates and grows a molten steel weld pool within the steel workpiece, and wherein stopping the electrical current further solidifies the molten steel weld pool into a steel weld nugget.

13. A method of spot welding a workpiece stack-up that includes a steel workpiece and an aluminum alloy workpiece, the method comprising:
    contacting a surface of a steel workpiece with a weld face of a steel welding electrode;

contacting a surface of an aluminum alloy workpiece, which overlaps the steel workpiece, with a weld face of an aluminum alloy welding electrode, the weld face of the aluminum alloy welding electrode comprising a depression and a perimeter region surrounding the depression, the perimeter region providing the weld face of the aluminum alloy welding electrode with a radius of curvature of 15 mm to 300 mm;

passing an electrical current between the steel welding electrode and the aluminum alloy welding electrode and across a faying interface of the steel workpiece and the aluminum alloy workpiece to initiate and grow a molten aluminum alloy weld pool within the aluminum alloy workpiece that wets the steel workpiece at the faying interface, wherein the perimeter region of the weld face of the aluminum alloy welding electrode has a continuous contact area with the aluminum alloy workpiece of at least 28 mm$^2$ distributed evenly around the depression at the onset of current flow between the steel welding electrode and the aluminum alloy welding electrode; and impressing the aluminum alloy welding electrode into the surface of the aluminum alloy workpiece during passage of the electrical current to form a contact patch that, following cessation of the electrical current, contains a bulge therein.

14. The method set forth in claim 13, wherein passing the electrical current comprises decreasing a current density of the electrical current within the aluminum alloy workpiece by passing the electrical current through the perimeter region of the weld face of the aluminum alloy welding electrode so that a sectional area through which the electrical current passes expands radially from the faying interface of the workpieces to the aluminum alloy welding electrode.

15. The method set forth in claim 13, wherein passing the electrical current between the steel welding electrode and the aluminum alloy welding electrode additionally initiates and grows a molten steel weld pool within the steel workpiece.

* * * * *